United States Patent [19]

Boffardi et al.

[11] Patent Number: 4,575,425
[45] Date of Patent: Mar. 11, 1986

[54] PROCESS FOR CONTROLLING CALCIUM OXALATE SCALE OVER A WIDE PH RANGE

[75] Inventors: Bennett P. Boffardi, Bethel Park; John P. Farkas; Monica A. Yorke, both of Coraopolis, all of Pa.

[73] Assignee: Calgon Corporation, Pittsburgh, Pa.

[21] Appl. No.: 685,513

[22] Filed: Dec. 24, 1984

[51] Int. Cl.$^4$ .................................. C02F 5/14
[52] U.S. Cl. ..................... 210/697; 210/700; 210/701; 252/180; 252/181
[58] Field of Search ............... 210/697–701; 203/7; 252/180, 181

[56] References Cited

U.S. PATENT DOCUMENTS

| 2,774,694 | 12/1956 | Wiggins | 134/13 |
| 3,449,164 | 6/1969 | Vinkler et al. | 134/3 |
| 3,518,204 | 6/1970 | Hansen, Jr. et al. | 252/181 |
| 3,692,673 | 9/1972 | Hoke et al. | 210/734 |
| 3,709,815 | 1/1973 | Boothe et al. | 210/701 |
| 3,709,816 | 1/1973 | Walker et al. | 210/701 |
| 3,806,367 | 4/1974 | Lange et al. | 134/3 |
| 3,837,803 | 9/1974 | Carter et al. | 252/181 |
| 3,890,228 | 6/1975 | Hwa et al. | 210/700 |
| 3,898,037 | 8/1975 | Lange et al. | 134/3 |
| 3,928,196 | 12/1975 | Persinski et al. | 252/180 |
| 4,108,680 | 8/1978 | Barr, Jr. | 134/3 |
| 4,118,318 | 10/1978 | Welder et al. | 252/180 |
| 4,209,398 | 6/1980 | Ii et al. | 210/701 |
| 4,255,259 | 3/1981 | Hwa et al. | 210/700 |
| 4,389,324 | 6/1983 | Keller | 210/698 |

FOREIGN PATENT DOCUMENTS

| 040350 | 4/1979 | Japan. |
| 081058 | 6/1979 | Japan. |
| 125014 | 9/1979 | Japan. |
| 059647 | 11/1979 | Japan. |
| 83/02607 | 8/1983 | PCT Int'l Appl. |
| 83/02628 | 8/1983 | PCT Int'l Appl. |
| 2061249 | 5/1981 | United Kingdom ............... 210/699 |

Primary Examiner—Peter Hruskoci
Attorney, Agent, or Firm—M. C. Sudol, Jr.; R. B. Olson; W. C. Mitchell

[57] ABSTRACT

The instant invention is directed to a composition useful for inhibiting precipitation of calcium oxalate in aqueous systems comprising: (a) a water soluble phosphate, phosphonate or phosphinate; and (b) a water soluble polyelectrolyte wherein the ratio of component (a) to component (b) ranges from 10:1 to 1:10.

The instant invention is further directed to a method of inhibiting the precipitation and deposition of calcium oxalate scale in an aqueous system, comprising adding to said system an effective amount of the above described composition, wherein said aqueous system has a pH greater than or equal to 2.0.

3 Claims, No Drawings

PROCESS FOR CONTROLLING CALCIUM OXALATE SCALE OVER A WIDE PH RANGE

BACKGROUND OF THE INVENTION

Most commercial water contains alkaline earth metal cations, such as calcium, magnesium, etc., and anions such as carbonate and oxalate. When combinations of these anions and cations are present in concentrations which exceed the solubility of their reaction products, precipitates form until their product solubility concentrations are no longer exceeded. For example, when the concentrations of calcium ion and oxalate ion exceed the solubility of the calcium oxalate reaction product, a solid phase of calcium oxalate will form as a precipitate.

Solubility product concentrations are exceeded for various reasons, such as evaporation of the water phase, change in pH, pressure or temperature, and the introduction of additional ions which can form insoluble compounds with the ions already present in the solution. As these reaction products precipitate on the surfaces of a water carrying system, they form scale. Scale prevents effective heat transfer, interferes with fluid flow, facilitates corrosive processes, and harbors bacteria. Scale is an expensive problem in many industrial water systems, causing delays and shutdowns for cleaning and removal.

Calcium oxalate is a common substituent of scale forming on the metallic surfaces of apparatuses used for thermal treatment of aqueous solutions and suspensions. It is known that calcium oxalate scale can be removed by washing pipes, tubes, or other metallic surfaces upon which calcium oxalate deposits have formed with dilute aqueous acid solutions, such as hydrochloric acid or nitric acid solutions. However, due to the limited solubility of calcium oxalate in these acids, repeated washings are necessary. Thus, acid washing constitutes a costly and time-consuming operation. Acid washing also deteriorates equipment.

U.S. Pat. No. 4,108,680 discloses a process for removing calcium oxalate scale from metallic surfaces comprising contacting said scale with an aqueous suspension containing nitric acid and manganese dioxide at a temperature between 20° C. and 95° C. This process, like the acid washing process previously discussed, is directed to removal of calcium oxalate which has formed on metallic surfaces. These processes are not directed to prevention or inhibition of calcium oxalate precipitation.

Accordingly, the need exists for a method of inhibiting the formation of calcium oxalate scale on metallic surfaces in contact with water over a wide pH range. Scale forming compounds can be prevented by inactivating either cations or anions by chemical means with chelating or sequestering agents, so that the solubility of their reaction products is not exceeded. Polyphosphates, such as a product which is $1.1Na_2O:1.0P_2O_5$, can control calcium oxalate scales up to a pH of approximately 4. However, calcium oxalate scale is difficult to control as the pH increases above 4. Since acrylates control calcium oxylate precipitation at pH's above 6.0, the most critical range for control is a pH of about 4.0 through a pH of about 6.0.

It is an object of this invention to provide a composition and process for the inhibition of calcium oxalate precipitation at pH's greater than or equal to 2.0, especially at pH's ranging from 4.0 to 6.0.

These and other objects of the instant invention are accomplished by a process in which an effective amount of an admixture comprising: (a) a compound selected from the group consisting of water soluble phosphates, water soluble phosphonates and water soluble phosphinates and (b) an anionic polyelectrolyte is added to an aqueous system, thereby preventing the deposition and precipitation of calcium oxalate scale on metallic surfaces in contact with the aqueous system over a wide pH range.

DETAILED DESCRIPTION OF THE INVENTION

The instant invention is directed to a method of inhibiting the precipitation and deposition of calcium oxalate scale in an aqueous system comprising adding to said system an effective amount of an admixture comprising: (a) a compound selected from the group consisting of water soluble phosphates, water soluble phosphonates and water soluble phosphinates and (b) an anionic polyelectrolyte wherein the ratio of component (a) to component (b) ranges from 10:1 to 1:10 by weight, and wherein the pH of said aqueous system is greater than or equal to 2.0.

The instant invention is further directed to a composition comprising: (a) a compound selected from the group consisting of water soluble phosphates, water soluble phosphonates and water soluble phosphinates and (b) an ionic polyelectrolyte, wherein said composition is useful in inhibiting or preventing the precipitation and deposition of calcium oxalate scale on metallic surfaces in contact with aqueous systems over a wide pH range.

Any water soluble phosphate can be used as component (a) in the compositions of the present invention. Preferred phosphates are "molecularly dehydrated phosphates", by which is meant any phosphate which can be considered as derived from a monobasic or dibasic orthophosphate or from orthophosphoric acid, or from a mixture of any two of these by elimination of water of constitution therefrom. There may be employed alkaline metal tripolyphosphates, or pyrophosphates, or the metaphosphate which is often designated as hexametaphosphate. Any molecularly dehydrated phosphate may be employed, but it is preferred to use those which have a molar ratio of alkaline metal to phosphorous methoxide from about 0.9:1 to about 2:1, the later being the alkaline metal pyrophosphate. While it is preferred to use the metaphosphates, pyrophosphates, or polyphosphates of sodium, because they are the least expensive and most readily available, it is also possible to use the molecularly dehydrated phosphates of other metals such as potassium, lithium, cesium, or rhobidium or the ammonium molecularly dehydrated phosphates, which in many instances are classified as being alkaline metal phosphates, or the alkaline earth metal molecularly dehydrated phosphates such as those as calcium, barium, or strontium, or mixtures of alkaline metal and alkaline earth molecularly dehydrated phosphates.

Additional examples of acceptable water soluble phosphates include phosphate esters; organophosphate esters, such as the lower alkyl mono-, di- and trialkyl phosphates. The alkyl group is selected from $C_1$ to $C_4$ and may be branched or unbranched. The alkyl group may be substituted with hydroxy, amino, halide, sulfate or sulfonate, alone or in combination.

The most preferred water soluble phosphate is sodium hexametaphosphate, such as "Calgon", available from Calgon Corporation, Pittsburgh, Pa., which may be described as $1.1NaO_2:1P_2O_5$.

Any water-soluble phosphonate may be used as component (a). Examples include 2-phosphono-1,2,4-tricarboxybutane, amino tri(methylene phosphonic acid), hydroxyethylidene diphosphonic acid, phosphonosuccinic acid, benzene phosphonic acid, 2-aminoethyl phosphonic acid, polyamino phosphonates and the like. The preferred phosphonates are 2-phosphono-1,2,4-tricarboxybutane, amino tri(methylene phosphonic acid) and hydroxyethylidene diphosphonic acid.

Any water soluble phosphinate may be used as component (a). Examples include alkyl phosphinic acids, such as methyl phosphinic acid, dialkyl phosphinic acids, such as dimethyl phosphinic acid and phosphino carboxylic acid. The preferred phosphinate is phosphino carboxylic acid.

The second component of the instant synergistic admixtures is an anionic water soluble polyelectrolyte. The preferred polyelectrolytes are polymers of any unsaturated carboxylic acid, or salts thereof. As examples of these preferred polymers, there may be mentioned: polymers of acrylic acid, methacrylic acid, alpha-halo-acrylic acid, maleic acid or anhydride, itaconic acid, vinyl acetic acid, allylacetic acid, fumaric acid, β-carboxyethyl acrylate and crotonic acid, alone or in combination, and salts thereof. Also preferred are polymers of acrylic acid and/or methacrylic acid with other polymerizable unsaturated water-soluble monomers, including but not limited to, 2-hydroxypropyl acrylate, vinyl sulfonic acid, vinyl phosphonic acid, vinyl acetate, ethyl vinyl ether, acrylamide, ethyl acrylate, ethyl methacrylate, methacrylamide, 2-acrylamido-2-methylpropyl sulfonic acid, 2-methacrylamido-2-methylpropyl-sulfonic acid, styrene sulfonic acid, sulfoalkyl acrylate, sulfoalkyl methacrylate, allyl sulfonic acid, methallyl sulfonic acid, 3-methacrylamido-2-hydroxy-propyl sulfonic acid, sulfonic acid acrylate, their salts and mixtures thereof. Also included in this class of polymers are those polymers of acrylamide which are partially hydrolyzed.

The molecular weight of the polymer used is not critical. The preferred polymers have molecular weights of from about 1,000 to about 5,000,000 and the most preferred polymers have molecular weights of from about 1,000 to about 5,000, as determined by light scattering techniques.

The most preferred polyelectrolytes for use in the instant method are: homopolymers of acrylic acid, homopolymers of methacrylic acid, copolymers of acrylic acid and methacrylic acid, copolymers of acrylic acid and 2-acrylamido-2-methyl propyl sulfonic acid, copolymers of methacrylic acid and 2-acrylamido 2-methyl propyl sulfonic acid, copolymers of acrylic acid and 2-hydroxypropyl acrylate, copolymers of methacrylic acid and 2-hydroxypropyl acrylate, poly maleic acid, copolymers of maleic acid or anhydride and sulfonated styrene, copolymers of maleic acid or anhydride and acrylic acid or methacrylic acid, and copolymers of acrylic acid or methacrylic acid and acrylamide or methacrylamide.

Homopolymers, as used herein, include polymers made from a single primary monomer but which optionally contain up to 5%, by weight, of one or more random unsaturated, polymerizable monomer(s). Likewise, copolymers, as used herein, include polymers made from two primary monomers, but which optionally contain up to 5%, by weight, of one or more random, unsaturated, polymerizable monomer(s).

The phrase "inhibiting the deposition or precipitation" is meant to include threshold inhibition, dispersion and/or solubilization of calcium oxalate scale.

The phrase "aqueous system" is meant to include any system containing water; including, but not limited to, cooling water systems, boilers, desalination systems, gas scrubbers, blast furnaces, sewage sludge thermal conditioning equipment, reverse osmosis systems, sugar evaporators, paper processing circuits, mining circuits and the like.

The weight ratio of component (a) to component (b) should be 10:1 to 1:10, preferably 1.5:1 to 1:1.5.

An effective amount of the calcium oxalate inhibitor disclosed herein means that level of inhibitor necessary to prevent deposition or precipitation of calcium oxalate in the system being treated. Treatment levels can be as high as 1,000 ppm. The preferred treatment level is from 0.1 to 10 ppm.

Unexpectedly, the instant inhibiting compositions prevent precipitation of calcium oxalate scale over a wide pH range. Thus, this composition is effective as a calcium oxalate scale inhibitor at a pH greater than or equal to 2.0. The inhibitors are especially effective as scale inhibitors in the pH range of 4.0 to 6.0. It is noteworthy that polyphosphonates alone can control scales up to a pH of approximately 4 and that polyacrylate alone can control calcium oxalate precipitation at pH's in excess of 6. Thus, the critical range for complete control of calcium oxalate precipitation is a pH of from approximately 4.0 through approximately 6.0. The inventors have discovered that, through synergism, the compositions of the instant application control scale in the range of pH 4 through pH 6. Calcium oxalate precipitation is not controlled throughout this range by components (a) and (b) of these admixtures individually.

The most preferred compositions are those prepared from: component (a), selected from the group consisting of: sodium hexametaphosphate, 2-phosphono-1,2,4 tricarboxybutane, amino tri(methalyne phosphinic acid), hydroxyethylidene diphosphonic acid, and phosphino carboxylic acid; and component (b), selected from the group consisting of polyacrylates, copolymers of acrylic acid and methacrylic acid, copolymers of acrylic acid and 2-acrylamido-2-methyl propyl sulfonic acid, copolymers of methacrylic acid and 2-acrylamido 2-methyl propyl sulfonic acid, copolymers of acrylic acid and 2-hydroxypropyl acrylate, copolymers of methacrylic acid and 2-hydroxypropyl acrylate, poly maleic acid, copolymers of maleic acid or anhydride and sulfonated styrene, copolymers of maleic acid or anhydride and acrylic acid or methacrylic acid, and copolymers of acrylic acid or methacrylic acid and acrylamide or methacrylamide.

These preferred compositions are effective inhibitors over a pH range of from 2.0 to 12.0.

The temperature of the system being treated is not critical to the effectiveness of this inhibitor, if below the temperature at which the individual components employed thermally destruct.

Though it is preferred to treat aqueous systems with admixtures comprising components (a) and (b), as described earlier, these components may be added separately to the system being treated without departing from the spirit of this invention.

EXAMPLES

The following examples illustrate the present invention in greater detail. It should be understood that the invention is not in any way limited by these examples.

The following abbreviations and product names are used in the examples and are defined as indicated:

AA-AMPS = a copolymer of acrylic acid and 2-acrylamido-2-methylpropyl sulfonic acid having a weight average molecular weight of about 8200, as determined by low angle laser light scattering.

PAA = polyacrylic acid, MWT = 2000, as determined by light scattering, available from Calgon Corporation.

PP = polyphosphate; this product, which is manufactured by Calgon Corporation, Pittsburgh, Pa., under the tradename Calgon, is defined as $1.1Na_2O:1P_2O_5$.

PMA = polymaleic acid, MWT = 1300, as determined by light scattering, 70% active; available from Ciba Geigy as Belclene 200.

HEDP = hydroxyethylidene diphosphonic acid.

PBS-AM = 2-phosphono-1,2,4-tricarboxybutane, manufactured by Mobay Chemical Corporation.

Natrol 42 = a solution of a 60/40 copolymer of acrylic acid and 2-hydroxypropyl acrylate, manufactured by National Starch Corporation.

AMP = amino tri(methylene phosphonic acid).

Belclene 500 = phosphinocarboxylic acid, manufactured by Ciba Geigy.

Versa TL-3 = copolymer of maleic anhydride and sulfonated styrene, manufactured by National Starch Corporation.

Rohm & Hass 980 = Copolymer of methacrylic acid and acrylic acid, manufactured by Rohm and Hass Corporation.

Cyanamer P-35 = Copolymer of acrylic acid and acrylamide manufactured by American Cyanamide Corporation.

EXAMPLES 1-20

Threshold inhibition flask tests were run for calcium oxalate. Due to the increased solubility of oxalate at pH's less than 4, a 3.5 millimole concentrate of calcium and oxalate ions was used to induce scaling. Solution pH was adjusted to within 0.2 units of the desired test pH prior to addition of inhibitor being treated. After addition of the inhibitor, the cation ($CaCl_2$) was added and the pH was adjusted to within 0.05 units of the desired pH. The flasks were then loosely capped and incubated for 24 hours at 62° C. Before titration, to determine the ppm of Ca remaining in solution, precipitated calcium oxalate was removed by filtering aliquots of all solution through a 0.45 um membrane. Final pH of the unfiltered test solution was considered to be the actual test pH. All inhibitor concentrations were calculated on an active basis.

Table 1, below, shows the results of examples 1-20. In examples 1-7 polyacrylic acid (PAA) alone was used as the inhibitor. In examples 8-13 polyphosphate (PP) was used as the sole inhibitor. In examples 17-20 a 1:1 combination by weight of polyacrylic acid and polyphosphate was used as the inhibitor.

TABLE I

| Example | Inhibitor (weight ratio) | pH | % Calcium Oxalate Inhibition at Designated Dosage (ppm of Inhibitor In Solution, Weight basis) | | |
|---|---|---|---|---|---|
| | | | (1 ppm) | (3 ppm) | (5 ppm) |
| 1 | PAA | 4.0 | 22.0 | 26.0 | 35.0 |
| 2 | PAA | 5.0 | 35.0* | 74.8* | 77.0* |
| 3 | PAA | 6.0 | 75.0 | 94.0 | 97.0 |
| 4 | PAA | 7.0 | 97.0 | 94.0 | 96.0 |
| | | | (1 ppm) | (5 ppm) | (15 ppm) |
| 5 | PAA | 8.5 | 66.0* | 67.5* | 82.5* |
| 6 | PAA | 10.0 | 81.0 | 75.5 | 84.5 |
| | | | (20 ppm) | (50 ppm) | (100 ppm) |
| 7 | PAA | 11.3 | 100.0 | 100.0 | 100.0 |
| 8 | PP | 2.0 | 100.0 | 100.0 | 100.0 |
| 9 | PP | 3.0 | 98.0 | 98.0 | 97.5 |
| 10 | PP | 4.0 | 93.5* | 93.5* | 93.0* |
| 11 | PP | 4.5 | 85.0 | — | — |
| 12 | PP | 5.0 | 9.5* | 60.0* | 62.5* |
| 13 | PP | 6.0 | No inhibition | 45.0 | 4.0 |
| | | | (1 ppm) | (5 ppm) | (15 ppm) |
| 14 | PP | 7.0 | 3.5* | 33.0* | 51.0* |
| 15 | PP | 8.5 | 1.5* | 53.5* | 69.0* |
| 16 | PP | 10.0 | 11.5* | 20.0* | 0.5* |
| 17 | PP/PAA (1:1) | 4.0 | 97.0 | 98.0 | 100.0 |
| 18 | PP/PAA (1:1) | 5.0 | 97.0 | 87.0 | 89.0 |
| 19 | PP/PAA (1:1) | 5.5 | — | 87.0 | 98.0 |
| 20 | PP/PAA (1:1) | 6.0 | 95.0 | 98.0 | 98.0 |

*represents an average of 2 data points

EXAMPLES 21-63

In these examples, additional flask tests were run according to the procedure of examples 1-20 using various inhibitors over wide pH ranges. The results are shown in Table II, below.

TABLE II

| Example | Inhibitor (weight ratio) | pH | % Calcium Oxalate Inhibition at Designated Dosage (ppm of Inhibitor In Solution, Weight basis) | | |
|---|---|---|---|---|---|
| | | | (1 ppm) | (3 ppm) | (5 ppm) |
| 21 | AA-AMPS | 2.0 | No inhibition | No inhibition | No inhibition |
| 22 | AA-AMPS | 4.0 | 8.0 | 4.0 | 4.0 |
| 23 | AA-AMPS | 5.0 | 28.0 | 41.0 | 44.0 |
| 24 | AA-AMPS | 6.0 | 41.0 | 45.0 | 51.0 |
| 25 | AA-AMPS | 7.0 | 36.0 | 55.0 | 54.0 |
| 26 | AA-AMPS | 8.5 | 38.3+ | 50.3+ | 59.7+ |
| 27 | AA-AMPS | 10.0 | 29.7+ | 64.7+ | 65.0+ |
| 28 | Natrol 42 | 2.0 | No inhibition | No inhibition | No inhibition |
| 29 | Natrol 42 | 4.0 | 16.0 | 12.0 | 12.0 |
| 30 | Natrol 42 | 5.0 | 25.0 | 46.0 | 41.0 |
| 31 | Natrol 42 | 6.0 | 42.0 | 57.0 | 56.0 |
| 32 | Natrol 42 | 7.0 | 44.0 | 50.0 | 42.0 |
| | | | (1 ppm) | (5 ppm) | (15 ppm) |
| 33 | Natrol 42 | 8.5 | 54.0 | 53.0 | 66.0 |
| 34 | Natrol 42 | 10.0 | 62.0 | 69.0 | 81.0 |
| | | | (1 ppm) | (3 ppm) | (5 ppm) |
| 35 | HEDP | 2.0 | 5.0 | 3.0 | 1.0 |
| 36 | HEDP | 4.0 | 6.0 | 4.0 | 4.0 |
| 37 | HEDP | 5.0 | 5.0 | 6.0 | 8.0 |
| 38 | HEDP | 6.0 | 21.0 | 42.0 | 41.0 |
| 39 | HEDP | 7.0 | 40.0 | 39.0 | 38.0 |
| | | | (1 ppm) | (5 ppm) | (15 ppm) |
| 40 | HEDP | 8.5 | 53.0* | 90.5* | 92.0* |
| 41 | HEDP | 10.0 | 73.0* | 91.0* | 93.0* |
| 42 | AMP | 5.5 | 25.5 | 24.8 | 32.5 |

TABLE II-continued

| Example | Inhibitor (weight ratio) | pH | % Calcium Oxalate Inhibition at Designated Dosage (ppm of Inhibitor In Solution, Weight basis) | | |
|---|---|---|---|---|---|
| 43 | AMP | 7.0 | 34.5* | 47.5* | 51.0* |
| 44 | AMP | 8.5 | 48.5* | 51.0* | 61.5* |
| 45 | AMP | 10.0 | 60.5* | 69.5* | 84.5* |
| 46 | Belclene 500 | 7.0 | 64.0* | 75.5* | 88.5* |
| 47 | Belclene 500 | 8.5 | 54.5* | 79.5* | 90.5* |
| 48 | Belclene 500 | 10.0 | 85.5* | 76.5* | 92.0* |
| 49 | VERSA TL-3 | 7.0 | 4.0 | 8.0 | 14.0 |
| 50 | VERSA TL-3 | 8.5 | 7.0 | 17.0 | 27.0 |
| 51 | VERSA TL-3 | 10.0 | 15.0 | 26.0 | 28.0 |
| 52 | PMA | 7.0 | 51.5* | 75.5 | 79.0* |
| 53 | PMA | 8.5 | 70.0* | 81.0* | 85.5* |
| 54 | PMA | 10.0 | 77.5* | 87.0* | 89.0* |
| 55 | PBS-AM | 7.0 | 39.0 | 52.0 | 58.0 |
| 56 | PBS-AM | 8.5 | 53.0 | 58.0 | 77.0 |
| 57 | PBS-AM | 10.0 | 65.0 | 85.0 | 96.0 |
| 58 | Rohm & Haas 980 | 7.0 | 69.0 | 85.0 | 50.0 |
| 59 | Rohm & Haas 980 | 8.5 | 59.0 | 77.0 | 81.0 |
| 60 | Rohm & Haas 980 | 10.0 | 89.0 | 89.0 | 85.0 |
| 61 | Cyanamer P-35 | 7.5 | 47.0* | 83.0* | 86.5* |
| 62 | Cyanamer P-35 | 8.5 | 49.0* | 87.0* | 87.0* |
| 63 | Cyanamer P-35 | 10.0 | 72.0* | 85.5* | 85.0* |

*represents an average of 2 data points
+represents an average of 3 data points

EXAMPLES 64–70

In these examples, additional flask tests were run according to the procedure of examples 1–20, using various combinations of inhibitors. The test solutions comprised 20 ml 0.01M $Na_2C_2O_4$, 20 ml 0.01M $CaCl_2 \cdot 2H_2O$ and 460 ml distilled water, less the inhibitor volume. This equates to 16.0 mg/l $Ca^{+2}$, and 35 mg/l $C_2O_4^{-2}$.

TABLE III

| Example | Inhibitor | pH | Inhibitor Ratio | Dosage (ppm of Inhibitor in Solution, Weight Basis) | Percent Calcium Oxalate Inhibition |
|---|---|---|---|---|---|
| 64 | PP/PAA | 5.5 | 10:1 | 4/0.4 | 93.3 |
|  |  |  | 1:10 | 0.4/4 | 97.6 |
| 65 | AA-AMPS/PP | 5.5 | 10:1 | 8/0.8 | 81.7 |
|  |  |  | 1:1 | 4/4 | 86.6 |
|  |  |  | 1:10 | 0.8/8 | 70.4 |
| 66 | Natrol 42/PP | 5.5 | 10:1 | 8/0.8 | 87.1 |
|  |  |  | 1:1 | 4/4 | 82.1 |
|  |  |  | 1:10 | 0.8/8 | 76.7 |
| 67 | AA-AMPS/ Natrol 42 | 5.5 | 10:1 | 8/0.8 | 74.8 |
|  |  |  | 1:1 | 4/4 | 64.5 |
|  |  |  | 1:10 | 0.8/8 | 66.0 |
| 68 | AMP/PAA | 5.5 | 10:1 | 8/0.8 | 90.1 |
|  |  |  | 1:1 | 4/4 | 91.4 |
|  |  |  | 1:10 | 0.8/8 | 98.7 |

What is claimed is:

1. A method of inhibiting the precipitation and deposition of calcium oxalate scale in an aqueous system, comprising adding to said system an effective amount of (a) a compound selected from the group consisting of water soluble metaphosphates, pyrophosphates or polyphosphates of sodium, potassium, cesium, rhobidium, or ammonium, and amino tri(methylene phosphonic acid); and (b) an anionic water soluble polyelectrolyte selected from the group consisting of homopolymers of acrylic acid, homopolymers of methacrylic acid, copolymers of acrylic acid and methacrylic acid, copolymers of acrylica acid and 2-acrylamido-2-methyl propyl sulfonic acid, copolymers of methacrylic acid and 2-acrylamido-2-methyl propyl sulfonic acid, copolymers of acrylic acid and 2-hydroxypropyl acrylate, and copolymers of methacrylic acid and 2-hdroxypropyl acrylate wherein the ratio of component (a) to component (b) ranges from 10:1 to 1:10 by weight, and wherein the pH of said aqueous system ranges from about 4.0 to 6.0.

2. The method of claim 1 wherein said effective amount ranges from 0.1 to 1,000 ppm, based on the weight of said aqueous system.

3. The method of claim 1 wherein said ratio of component (a) to component (b) is from 1.5:1 to 1:1.5.

* * * * *

UNITED STATES PATENT AND TRADEMARK OFFICE
CERTIFICATE OF CORRECTION

PATENT NO. : 4,575,425
DATED : March 11, 1986
INVENTOR(S) : Bennett P. Boffardi, John P. Farkas and Monica A. Yorke It is certified that error appears in the above—identified patent and that said Letters Patent is hereby corrected as shown below:

At Column 2, line 55, and at Column 8, line 27, "rhobidium" should read --rubidium--.

At Column 3, line 4, "$NaO_2$" should read --$Na_2O$--.

At Column 4, line 42, "methalyne" should read --methylene--.

At Column 8, line 33, "acrylica" should read --acrylic--.

At Column 8, line 37, "hdroxypropyl" should read --hydroxypropyl--.

Signed and Sealed this

Twenty-second Day of July 1986

[SEAL]

*Attest:*

DONALD J. QUIGG

*Attesting Officer*  *Commissioner of Patents and Trademarks*